United States Patent
Glynn et al.

(10) Patent No.: US 9,302,759 B2
(45) Date of Patent: Apr. 5, 2016

(54) FLEXIBLE TRUSS FRAME AND METHOD OF MAKING THE SAME

(71) Applicant: The Boeing Company, Chicago, IL (US)

(72) Inventors: Andrew K. Glynn, North Melbourne (AU); Steve Georgiadis, Melbourne (AU); David Andrew Pook, Melbourne (AU)

(73) Assignee: THE BOEING COMPANY, Chicago, IL (US)

( * ) Notice: Subject to any disclaimer, the term of this patent is extended or adjusted under 35 U.S.C. 154(b) by 85 days.

(21) Appl. No.: 14/146,923

(22) Filed: Jan. 3, 2014

(65) Prior Publication Data

US 2014/0117159 A1    May 1, 2014

Related U.S. Application Data

(62) Division of application No. 13/184,806, filed on Jul. 18, 2011, now Pat. No. 8,651,419.

(51) Int. Cl.
*B64C 1/06* (2006.01)
*B32B 37/12* (2006.01)
*B32B 37/18* (2006.01)
*B64C 1/00* (2006.01)

(52) U.S. Cl.
CPC ............. *B64C 1/061* (2013.01); *B32B 37/1284* (2013.01); *B32B 37/18* (2013.01); *B64C 2001/0072* (2013.01); *B64C 2001/0081* (2013.01); *Y02T 50/433* (2013.01); *Y10T 29/49622* (2015.01); *Y10T 428/24669* (2015.01)

(58) Field of Classification Search
CPC .... B64C 1/061; B64C 2001/0072; B64C 1/12
USPC ........ 244/117 R, 123.1, 123.12, 123.3, 123.4
See application file for complete search history.

(56) References Cited

U.S. PATENT DOCUMENTS

| | | | |
|---|---|---|---|
| 3,023,860 A | 3/1962 | Ellzey | |
| 4,167,598 A | 9/1979 | Logan et al. | |
| 5,332,178 A * | 7/1994 | Williams | 244/123.3 |
| 6,586,054 B2 | 7/2003 | Walsh | |
| 6,627,142 B2 | 9/2003 | Slaughter et al. | |
| 6,896,841 B2 | 5/2005 | Velicki et al. | |
| 7,334,782 B2 | 2/2008 | Woods et al. | |
| 7,410,352 B2 | 8/2008 | Sarh | |
| 7,503,368 B2 * | 3/2009 | Chapman et al. | 156/425 |
| 7,633,040 B2 | 12/2009 | Glain et al. | |

(Continued)

FOREIGN PATENT DOCUMENTS

| | | |
|---|---|---|
| DE | 102009047040 A1 | 6/2011 |
| NL | 1001725 C2 | 5/1997 |
| WO | WO 2011070002 A1 * | 6/2011 |

OTHER PUBLICATIONS

International Preliminary Report on Patentability, dated Jan. 21, 2014, regarding Application No. PCT/US2012/042890, 6 pages.

*Primary Examiner* — Nicholas McFall
(74) *Attorney, Agent, or Firm* — Yee & Associates, P.C.

(57) ABSTRACT

A composite frame includes a plurality of truss elements covered by a cap. The truss elements are flexibly coupled with each other and with the cap. The frame flexes to conform to a contoured surface to which it is attached. Once attached, the installed frame provides the required rigidity to the structure.

11 Claims, 18 Drawing Sheets

(56) References Cited

U.S. PATENT DOCUMENTS

| | | |
|---|---|---|
| 8,651,419 B2 | 2/2014 | Glynn et al. |
| 2006/0231682 A1 | 10/2006 | Sarh |
| 2008/0179460 A1 | 7/2008 | Rodriguez et al. |
| 2008/0290214 A1 * | 11/2008 | Guzman et al. ............... 244/119 |
| 2009/0246446 A1 * | 10/2009 | Backhouse ..................... 428/76 |
| 2010/0285265 A1 * | 11/2010 | Shinoda et al. ................. 428/80 |
| 2011/0315824 A1 | 12/2011 | Pook et al. |
| 2012/0052247 A1 | 3/2012 | Pook et al. |
| 2012/0119422 A1 | 5/2012 | Lockett et al. |
| 2013/0000815 A1 * | 1/2013 | Barlag et al. .................... 156/64 |
| 2013/0020438 A1 | 1/2013 | Glynn et al. |

\* cited by examiner

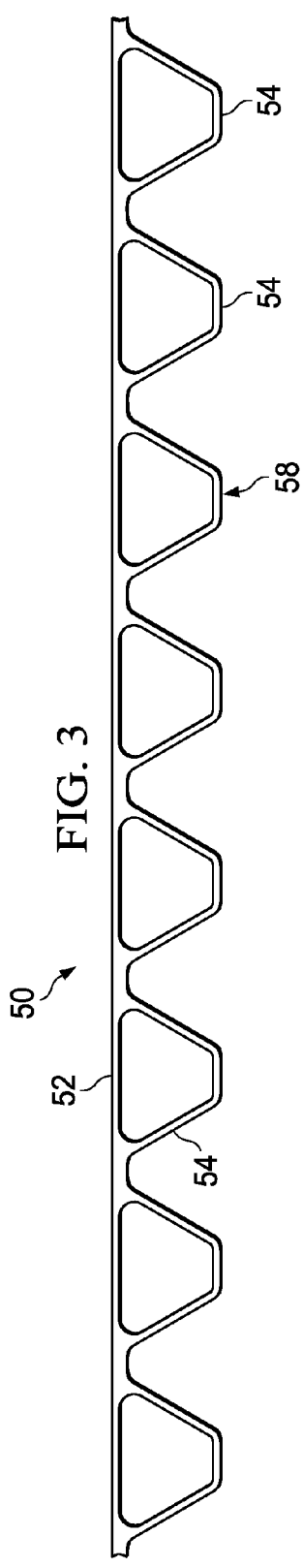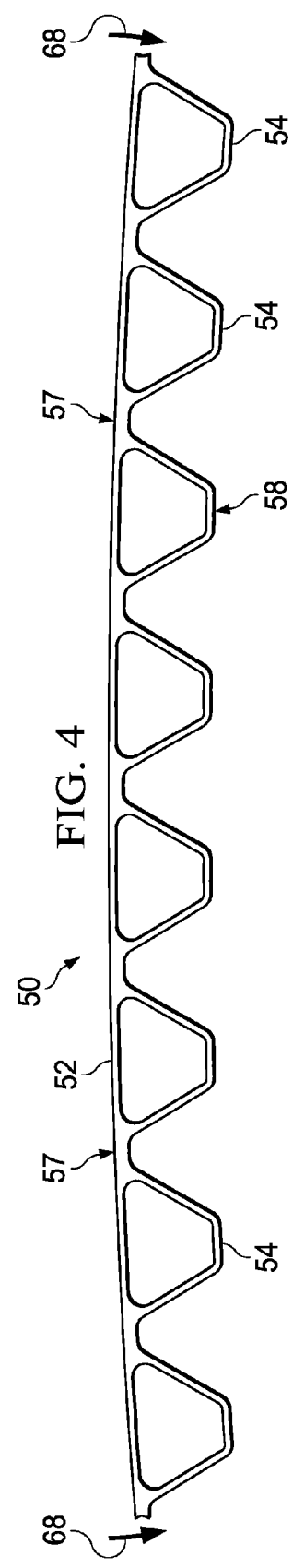

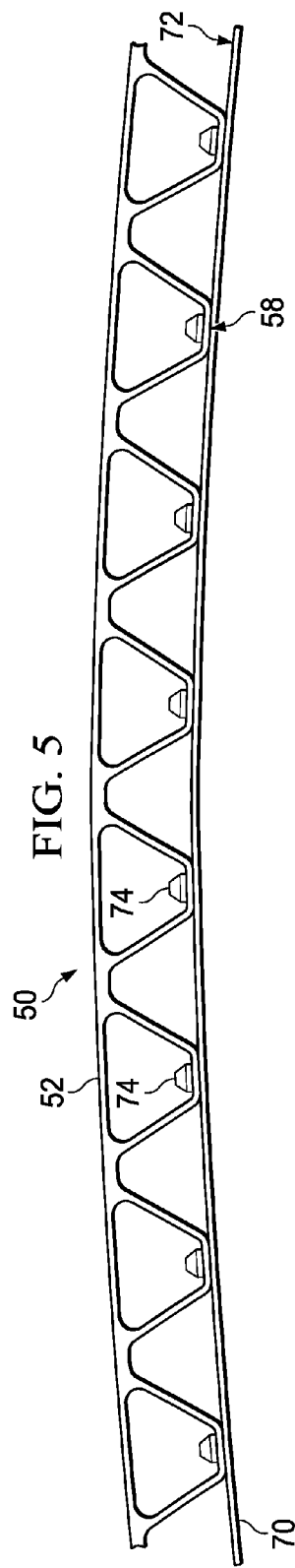
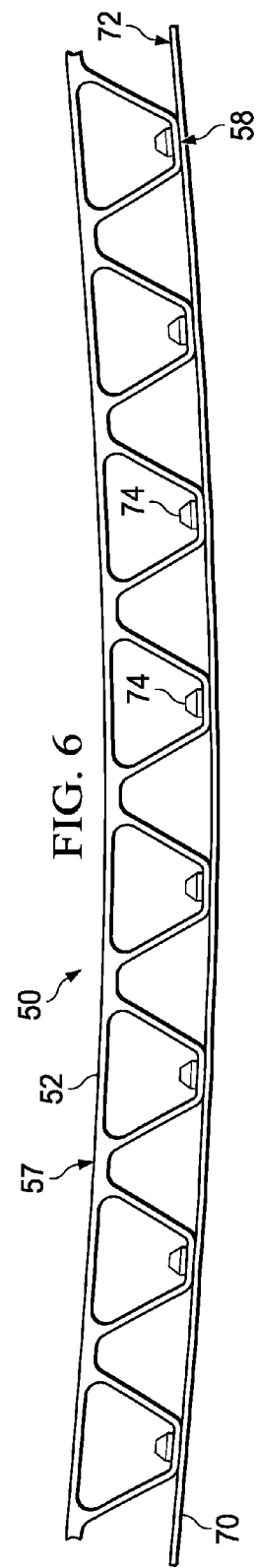

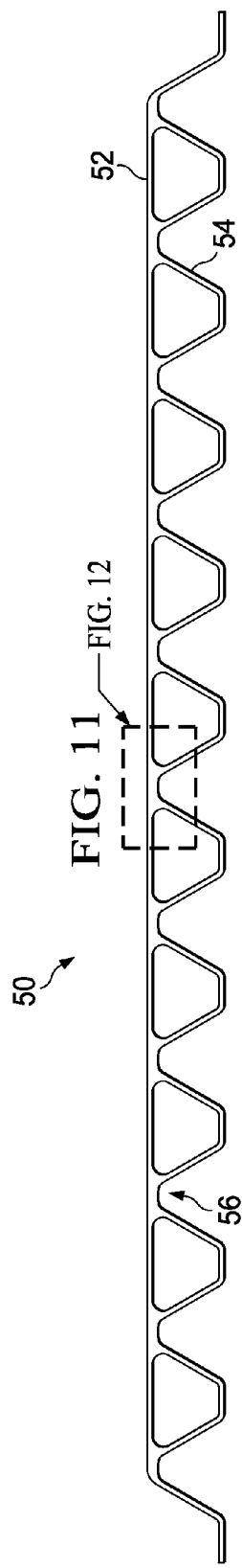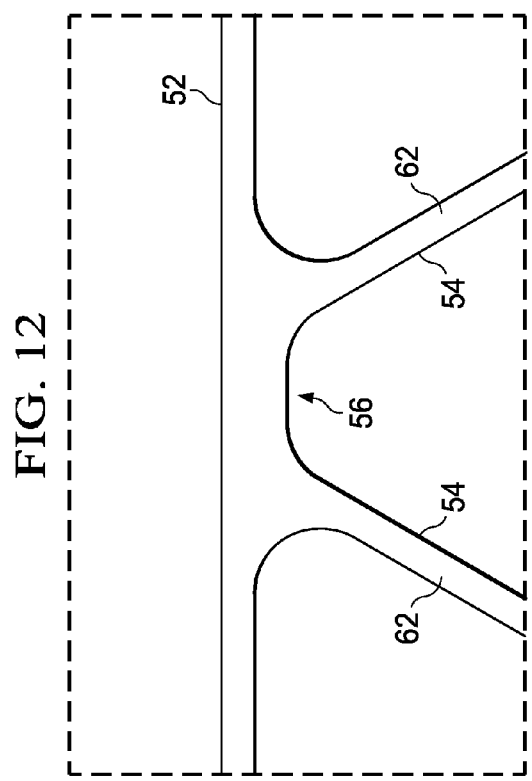
FIG. 11
FIG. 12

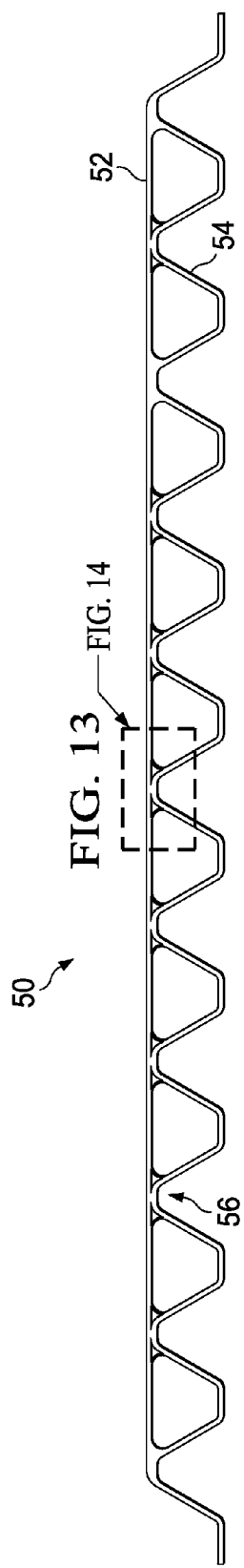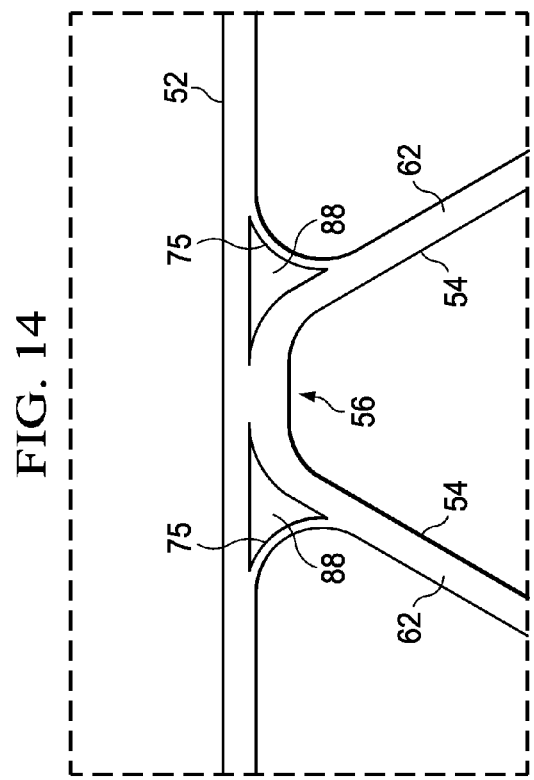

FLEXIBLE TRUSS FRAME AND METHOD OF MAKING THE SAME

This application is a divisional application of U.S. application Ser. No. 13/184,806, filed Jul. 18, 2011.

BACKGROUND INFORMATION

1. Field

The present disclosure generally relates to composite structures, and deals more particularly with a flexible truss frame for stiffening structures, as well as a method of making the frame.

2. Background

Structures such as airframes typically contain a number of lateral stiffening elements such as frames and ribs at regular intervals along the length of the structure. Conventional stiffening elements may have characteristics which increase their cost and complexity in some applications. For example, each of the lateral stiffening elements in an airframe may require a unique inner mold line surface contour in order to conform to a skin at each location along the airframe. Thus, each of the stiffening elements is a unique part.

Rigid stiffening elements often require shimming during the assembly process to accommodate buildup of manufactured tolerances. Shimming is time consuming and may require complex geometric shim shapes which may affect joint strength, stiffness and/or durability. The design of lateral stiffening elements in airframes may also be complicated by the need to span intersecting stiffeners such as longitudinal hat stiffeners and blade stiffeners. In order to accommodate these longitudinal stiffeners, the lateral frames may be provided with openings referred to as "mouseholes" next to the skin to allow passage of the longitudinal stiffeners through the frames. Mouseholes add complexity to the manufacturing process and may result in undesirable stress concentrations in the airframe.

Accordingly, there is a need for lateral stiffening elements such as frames that have a common design but which accommodate variations in surface contours at their points of attachment, thereby reducing recurring and nonrecurring costs. There is also a need for lateral stiffening elements that reduce or eliminate the need for shimming during the installation process and which have standard openings that accommodate intersecting longitudinal stiffeners.

SUMMARY

The disclosed embodiments provide a structural frame suitable for stiffening primary and secondary structures, particularly composite structures. The frame comprises a combination of truss elements and a continuous cap arranged to form articulations along the length of the frame which allow the frame to flex or bend during installation. Flexing of the frame allows it to conform to local surface contours of a structure during installation, however, the frame provides required rigidity in all planes after it is attached to the structure. The degree of flexibility of the frame may be readily tailored to suit the requirements a particular application. The flexibility of the frame allows it to be manufactured as a standardized common part that may be used in multiple locations, thereby significantly reducing the number of unique parts and associated recurring and nonrecurring costs. The frame may be fastened to a contoured surface without shimming, using typical assembly installation forces. The disclosed frame may reduce total part count, and may reduce stress concentrations in the area of intersecting longitudinal stiffening elements.

According to one disclosed embodiment, a composite frame is provided that is adapted to be attached to a contoured surface. The frame comprises a plurality of truss elements flexibly coupled with each other, and a cap extending across and joined to the truss elements. The cap is continuous and flexible, and each of the truss elements may be hat-shaped in cross section. Adjacent ones of the truss elements are joined to each other and to the cap at a flexible node. Each of the truss elements of the cap may be formed of a fiber reinforced synthetic resin. In one embodiment, the truss elements of the cap are formed of a unitary construction. Adjacent ones of the truss elements are spaced apart to define a gap adapted to receive a transversely extending stiffener.

According to another disclosed embodiment, a method is provided of fabricating a composite truss frame. The method comprises laying up first and second fiber reinforcements on the tool and placing a plurality of forming mandrels between the first and second fiber reinforcements. The method further includes infusing the fiber reinforcements with resin. The method may also comprise placing a third fiber reinforcement around each of the mandrels, curing the infused reinforcements and removing the mandrels from the frame after the infused reinforcements have been cured. The fiber reinforcements may be compacted during a resin infusion process using conventional vacuum bagging techniques.

According to a further embodiment, a method is provided of fabricating an airframe. The method comprises providing a skin having a contoured surface and making a flexible frame having a plurality of truss elements. The method further comprises bringing the truss elements into contact with the contoured surface of the skin by flexing the frame, and joining the frame to the skin. Making the frame may include laying up fiber reinforcements on the tool and infusing the reinforcements with resin, and curing the resin infused fiber reinforcements. Making the flexible frame may be performed by forming a panel by joining a substantially flat panel member with a corrugated panel member, and cutting sections of the panel.

According to still another embodiment, a method is provided of fabricating a plurality of composite truss frames, comprising forming a panel having a cap and a plurality of truss elements joined to the cap, and cutting the panel into a plurality of individual truss frames.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 3 is an illustration of a diagrammatic side view of the truss frame shown in FIG. 1 before being flexed.

FIG. 4 is an illustration similar to FIG. 3 but showing the truss frame having been flexed in preparation for assembly.

FIG. 5 is an illustration similar to FIG. 4 but showing the flexed truss frame having been attached to a convex surface.

FIG. 6 is an illustration similar to FIG. 5 showing the truss frame having been flexed in the opposite direction and attached to a concave surface.

FIG. 11 is an illustration of a side view of a truss frame of a unitary construction.

FIG. 12 is an illustration of the area designated as "FIG. 12" in FIG. 11.

FIG. 13 is an illustration similar to FIG. 11 but showing a truss frame constructed from composite components.

FIG. 14 is an illustration of the area designated as "FIG. 14" in FIG. 13, illustrating the inclusion of fillet noodles.

DETAILED DESCRIPTION

Figure 1:
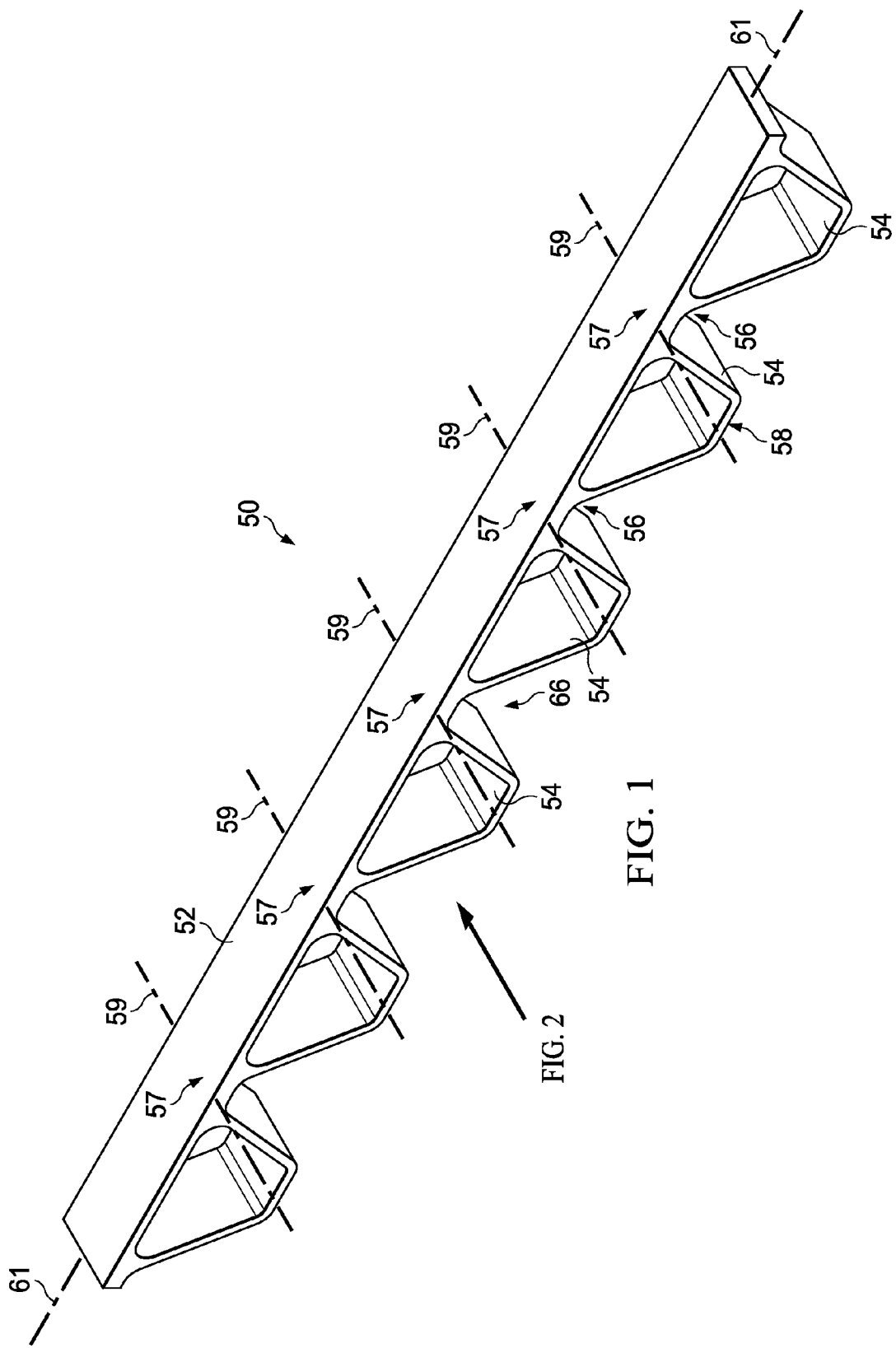
FIG. 1 is an illustration of a perspective view of a flexible truss frame according to the disclosed embodiments.
Figure 2:
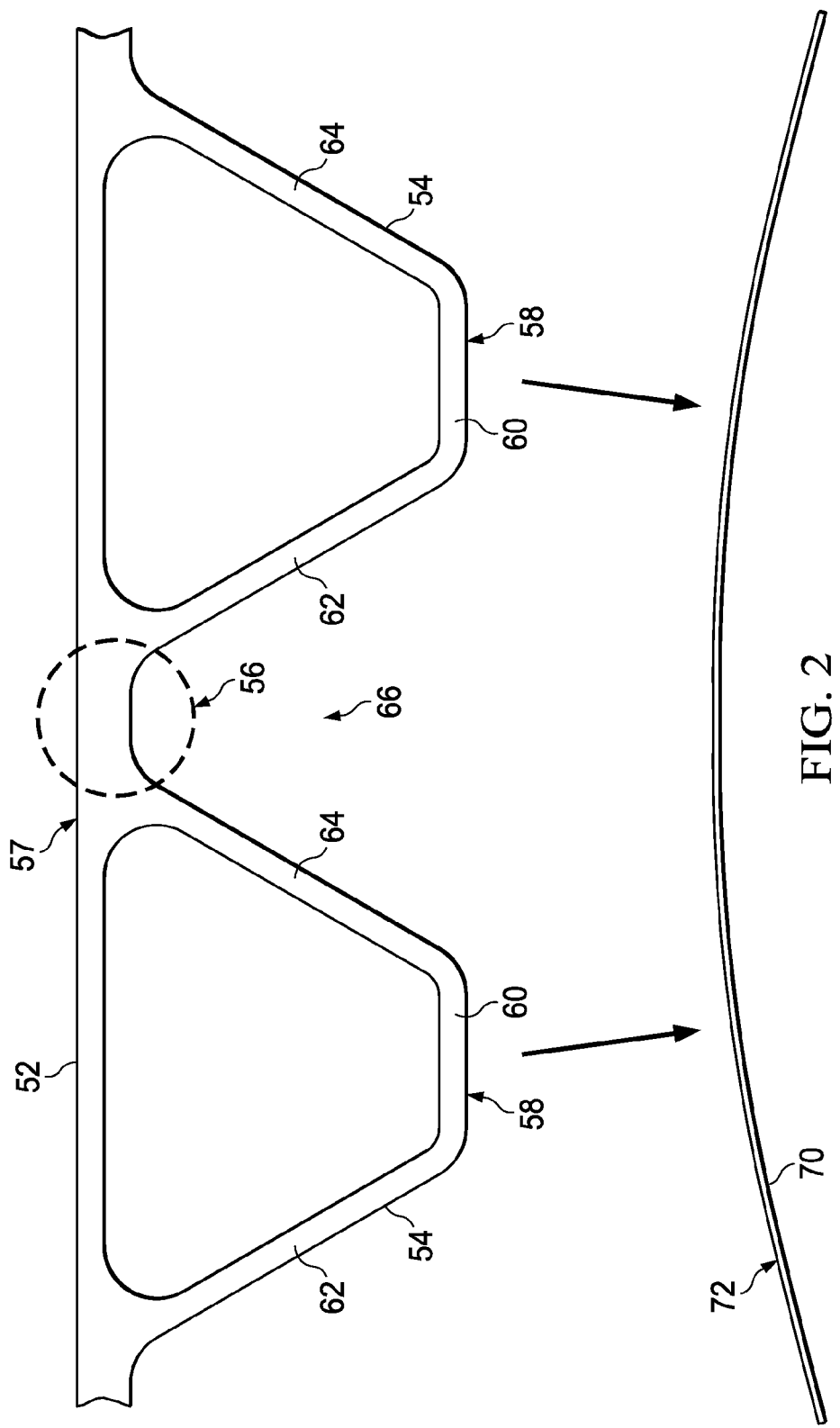
FIG. 2 is an illustration of a view in the direction shown as "FIG. 2" in FIG. 1.
Figure 8:
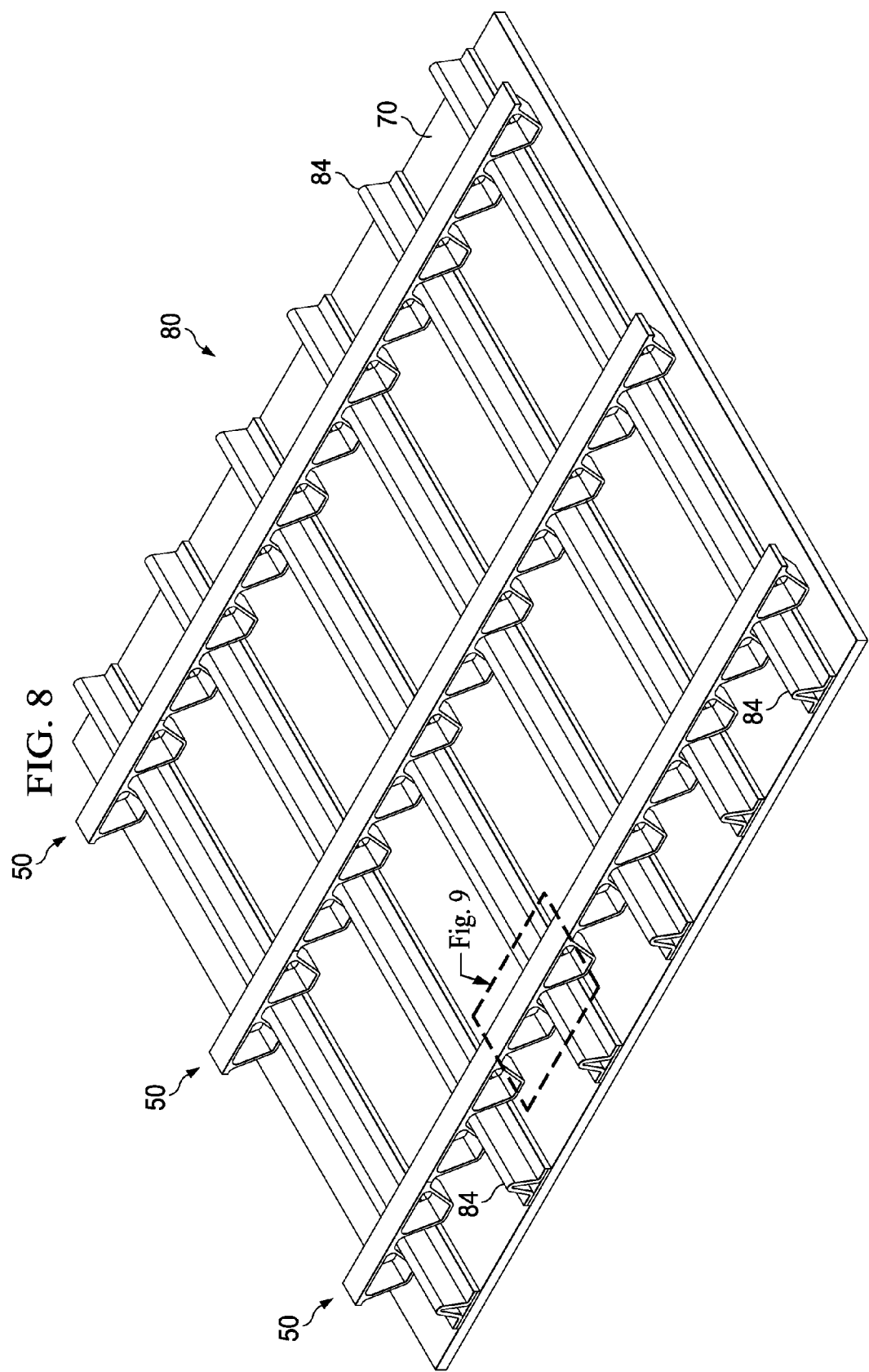
FIG. 8 is an illustration of a perspective view of a section of an airframe incorporating the disclosed truss frames.

Referring first to FIGS. 1 and 2, the disclosed embodiments relate to a flexible truss frame 50 suitable for use in primary and secondary structures, such as the skin 70 covering an airframe (FIG. 8). As will be discussed below in more detail, the frame 50 may be formed of composite materials and is flexible along its length during the installation process so as to conform to local contours of the surface 72 of the skin 70. The flexibility of the frame 50 allows it to be manufactured as a common part that fits-up to differing contours of the skin surface 72. Although the frame 50 is flexible under typical assembly forces to conform to local contours of the skin surface 72, the frame 50 provides the required stiffness and rigidity after it is attached to the skin 70. It should be noted here that while an airframe skin 70 has been disclosed for illustrative purposes, the flexible frame 50 may be employed to stiffen a wide range of other primary and secondary structures used in a variety of applications.

The truss 50 broadly comprises a continuous cap 52, and a plurality of aligned, continuous truss elements forming a truss type architecture which is efficient in transferring loads and capable of providing a desired amount of lateral stiffness required to stabilize a stiffened structure for a given set of loads. Adjacent truss elements 54 are connected to each other and to the cap 52 at nodes 56. The truss elements 54 carry shear loads, and the combination of the truss elements 54, the continuous cap 52 and the skin 70 carry bending loads. In the disclosed embodiments, each of the truss elements 54 has an inverted hat-shaped cross section, comprising inclined sides 62, 64, and a base 60 having an outer faying surface 58 adapted to contact the skin surface 72. Inclination of the side wall 62, 64 of adjacent truss elements 58 forms gaps 66 between adjacent truss elements 54. As will be discussed below, the frame 50 may be constructed of a wide range of synthetic materials, including reinforced and non-reinforced thermoplastics and thermoset resins and/or flexible metals. The cap 52 and adjacent truss elements 54 may flex slightly relative to each other at the nodes 56 about axes 57 such that the nodes 56 form flexible joints or articulations 57 in the frame 50 along its length that allow the faying surfaces 58 of the truss elements 54 to conform to local contours on the skin surface 72 to which the frame 50 is to be attached. Moreover, the flexibility provided at each of the nodes 56 may allow some embodiments of the frame 50 to twist about its longitudinal axis 61 in response to torsional forces applied to the frame 50 during its installation.

FIG. 3 illustrates the frame 50 in a substantially flat state prior to being shaped to conform to a contoured surface 72 (FIG. 2) of the skin 70 or other structure. FIG. 4 shows the frame 50 being flexed 68 at the articulations 57 using normal assembly forces in preparation for placing the frame 50 on the skin surface 72. FIG. 5 shows the flexed frame 50 having been placed on the contoured skin surface 72 and secured to the skin 70 by means of fasteners 74. In this example, the contoured skin surface 72 is convex shaped, however the frame 50 may be flexed at the articulations 57 in order to conform the frame 50 to a variety of simple or complex curves and contours of the skin surface 72. The faying surfaces 58 of each of the truss elements 54 engages the skin surface 72 in substantially face-to-face contact over substantially the entire area of the faying surface 58. While fasteners 74 are used to join the frame 50 to the skin 70 in the illustrated example, other fastening techniques may be employed, including bonding or co-curing in applications where the skin 70 is formed of composite materials.

FIG. 6 illustrates the frame 50 having been flexed in a direction opposite that shown in FIG. 4 so that the faying surfaces 58 of the frame 50 conformally engage a concave surface 72 on the skin 70.

Figure 7:
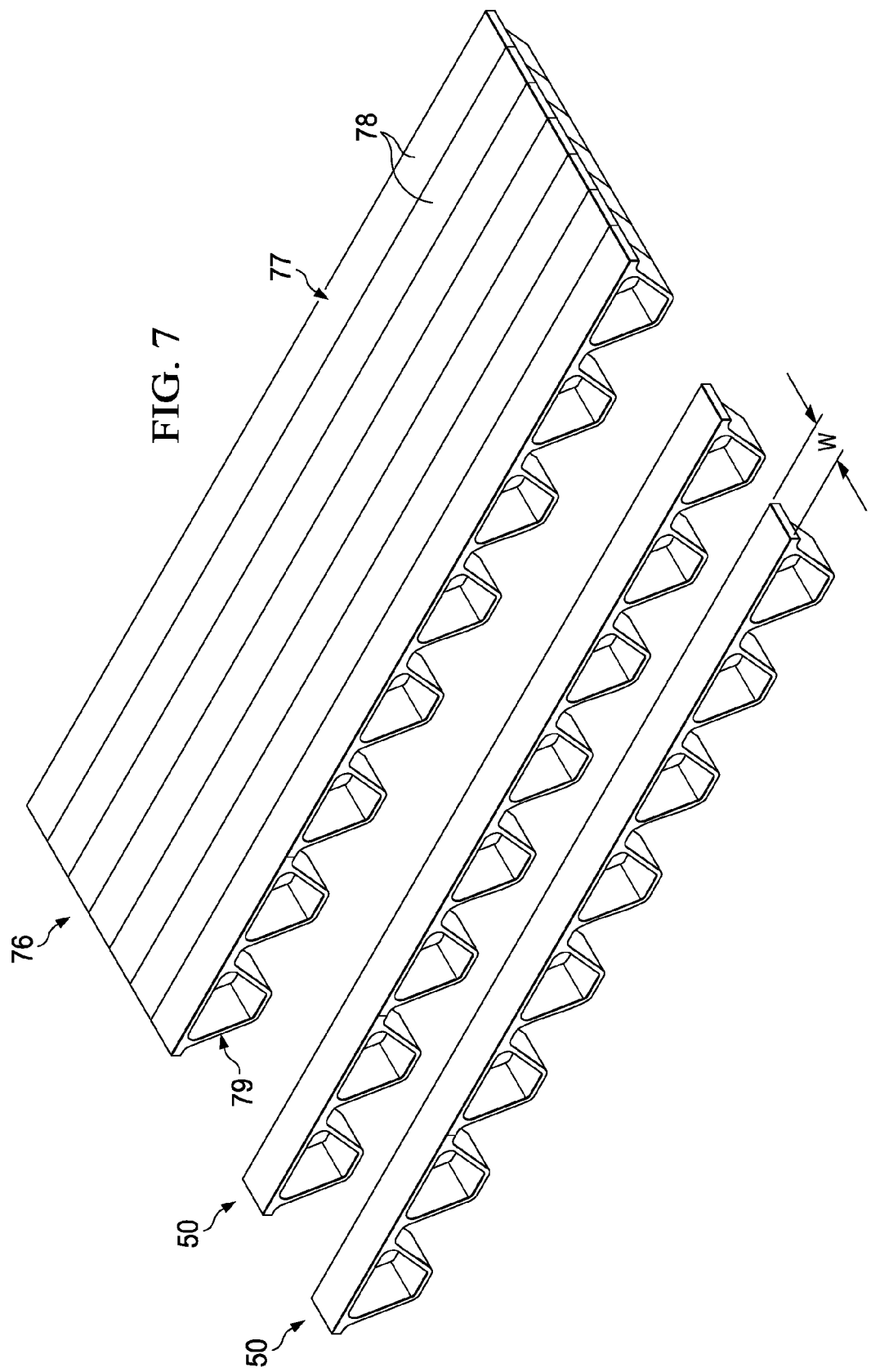
FIG. 7 is an illustration of a perspective, exploded view showing two truss frames having been cut away from a panel.

Referring to FIG. 7, multiple truss frames 50 may be advantageously fabricated from a single part in the form of a composite panel 76. The panel 76 comprises a substantially flat panel member 77 joined face-to-face to a corrugated panel member 79 by bonding or co-curing. Each of the panel members 77, 79 may comprise laminated plies of fiber reinforced thermoset resin, such as without limitation, a carbon fiber reinforced epoxy resin. The plies may be laid up and cured using prepregs or resin infusion of fiber preforms. In other embodiments, the panel 76 may be manufactured by molding the two panel members 77, 79 as a single integrated part using a suitable fiber reinforced or non-reinforced thermoplastic. After the panel 76 has been fabricated, it may be cut or otherwise separated along lines 78 into individual truss frames 50 having a desired width "W" and substantially identical cross sectional shapes. If desired, truss frames 50 having differing widths "W" may be cut from the same panel 76.

Figure 9:
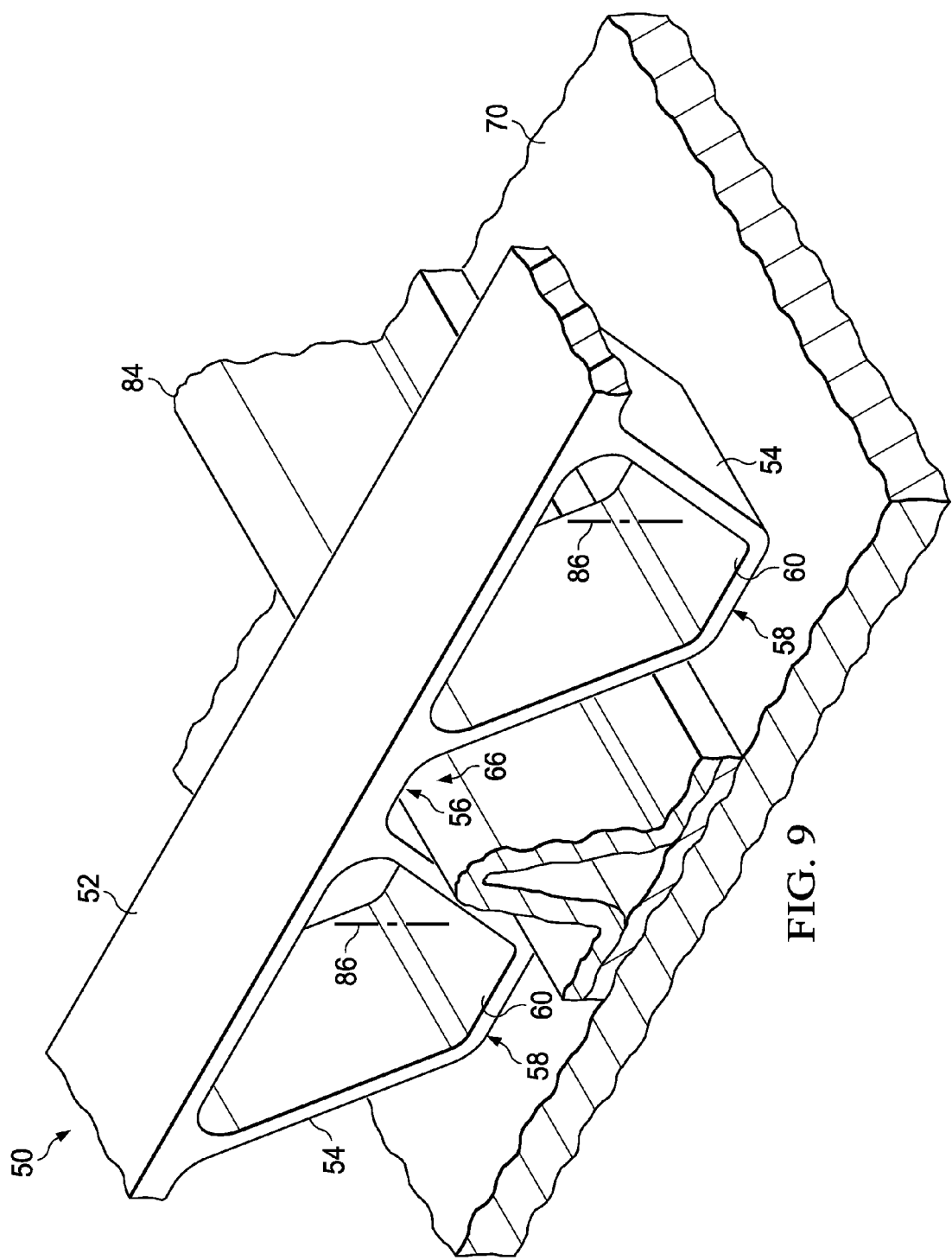
FIG. 9 is an illustration of a perspective view of the area designated as "FIG. 9" in FIG. 8.

FIGS. 8 and 9 illustrate an airframe 80 comprising an outer skin 70 supported on a plurality of longitudinally spaced truss frames 50. Longitudinally extending stiffeners 84 are attached to the skin 70 and pass through the gaps 66 (FIG. 9) between adjacent truss elements 54.

Figure 10:
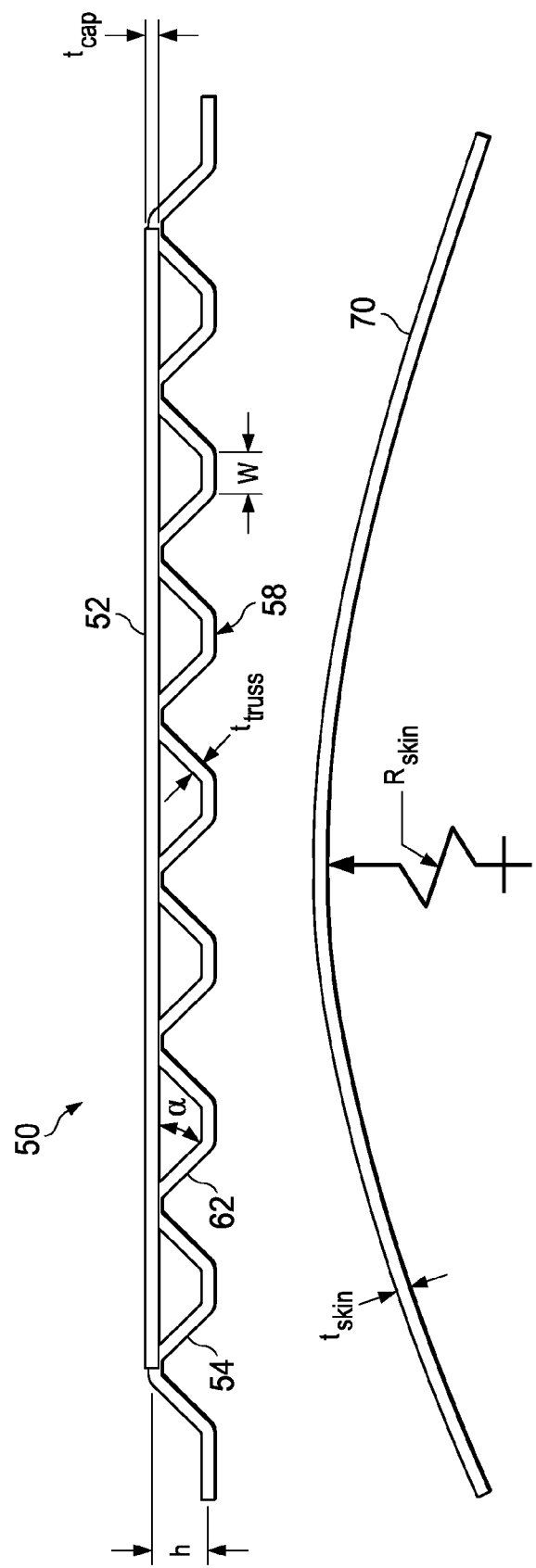
FIG. 10 is an illustration of a side view of a truss frame in relation to a contoured skin showing certain frame parameters.

Referring to FIG. 10, the degree of flexibility of the truss frame 50 prior to its installation is dependent upon the compliance and thickness $t_{cap}$ of the cap 52 and the thickness $t_{truss}$ of each of the truss elements 54. The stiffness of the truss frame 50 after its attachment to the skin 82 installation is a function of the compliance and thickness $t_{cap}$ of the cap 52, the thickness of the $t_{skin}$ 70, the truss angle α alpha between the cap 52 and the sides 62, 64 of the truss elements 54, as well as the width "W" of the faying surfaces 60. Importantly, the degree of flexibility of the truss frame 50 may be tailored to suit the requirements of the particular application. This tailoring may be achieved through the selection of the number and/or orientation of the plies forming the cap 52 and/or sides 62, 64, and/or through choice of the geometry of the truss frame 50. Thus for example, the truss frame 50 may be designed such that it has just enough flexibility to allow it to conform to the curvature of a skin 82 at a particular point on the airframe 80 while imparting the required level of rigidity to the airframe 80 at that point.

FIGS. 11 and 12 illustrate an embodiment of the truss frame 50 in which the cap 52 and the truss elements 54 are formed as an integrated structure, as by molding a thermoplastic material. In this embodiment, the intersection between the cap 52 and the truss elements 54 forms an integrated node 56 that is free of distinct elements. The absence of distinct elements or boundaries within the node 56 may increase the damage tolerance of the truss frame 50 when used in primary composite structures.

FIGS. 13 and 14 illustrate another embodiment of the truss frame 50 that may be fabricated using prepreg or liquid molding processes. In this embodiment, in order to increase the damage tolerance on the frame 50 fillers, sometimes referred to as fillet noodles 88 are placed between the truss elements 54 and the cap 52. The noodles 88 may be covered by return or wrap plies 75 which overlap the cap 52 as well as the truss elements 54.

Figure 15:
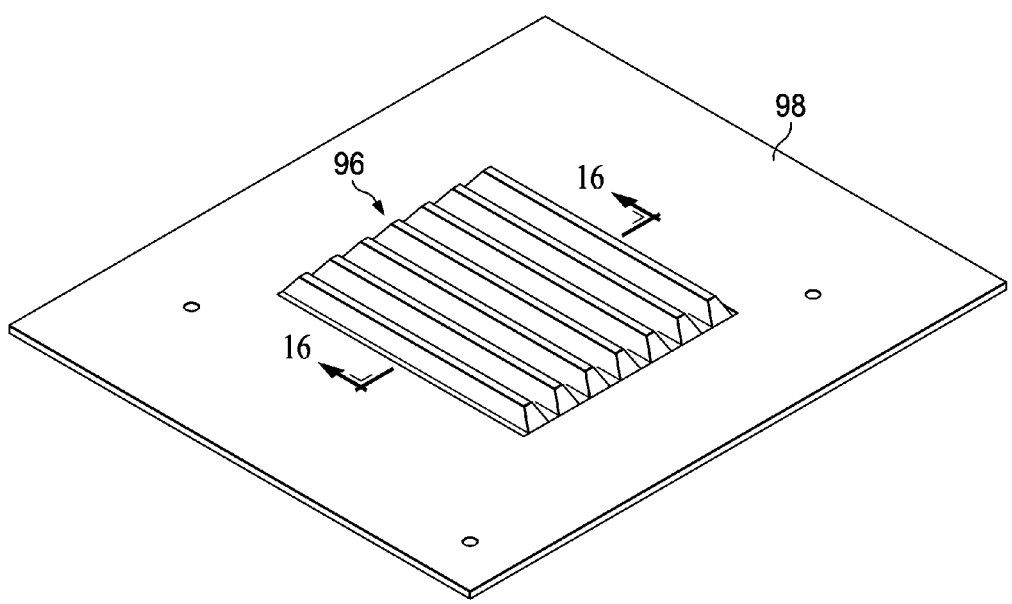
FIG. 15 is an illustration of a perspective view of a corrugated infusion tool used to manufacture the flexible truss frame.
Figure 16:
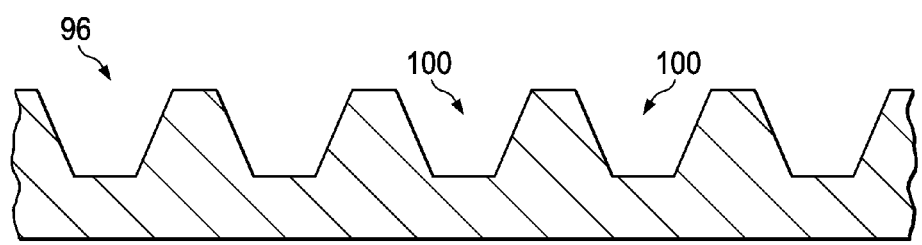
FIG. 16 is an illustration of a sectional view taken along the line 16-16 in FIG. 15.
Figure 17:
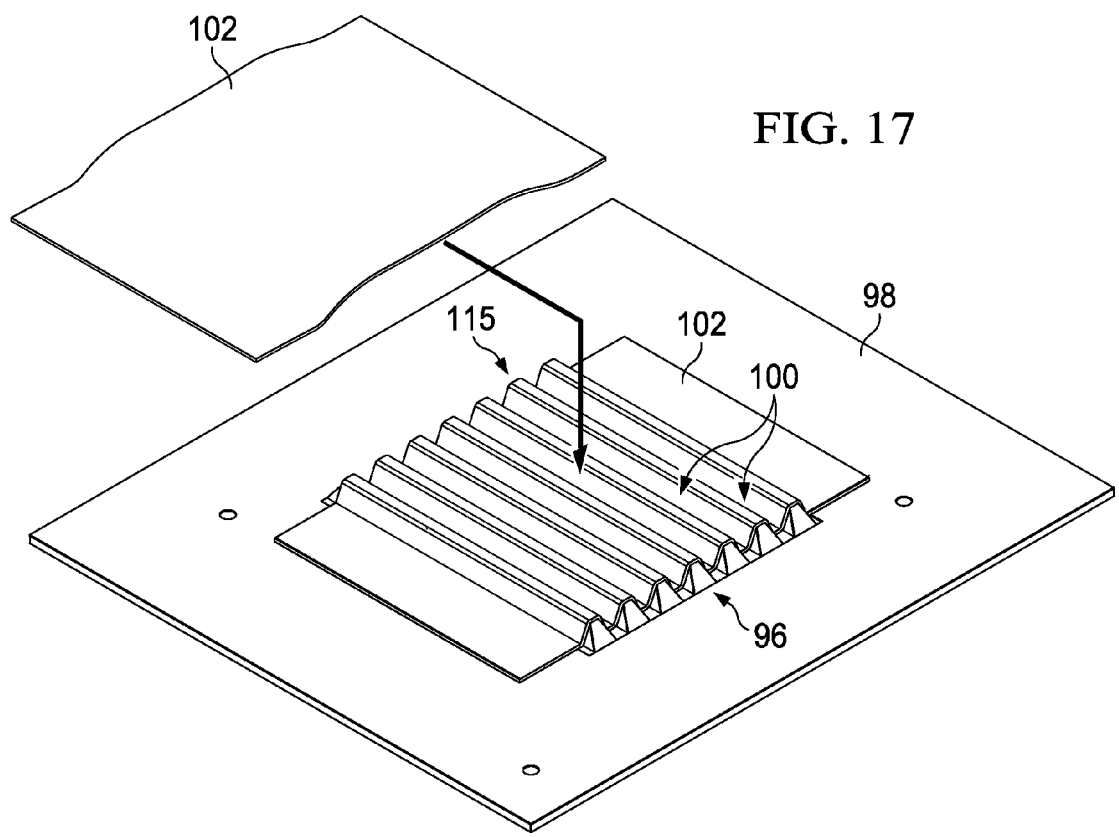
FIG. 17 is an illustration similar to FIG. 15 but showing a first ply having been placed over the tool.
Figure 19:
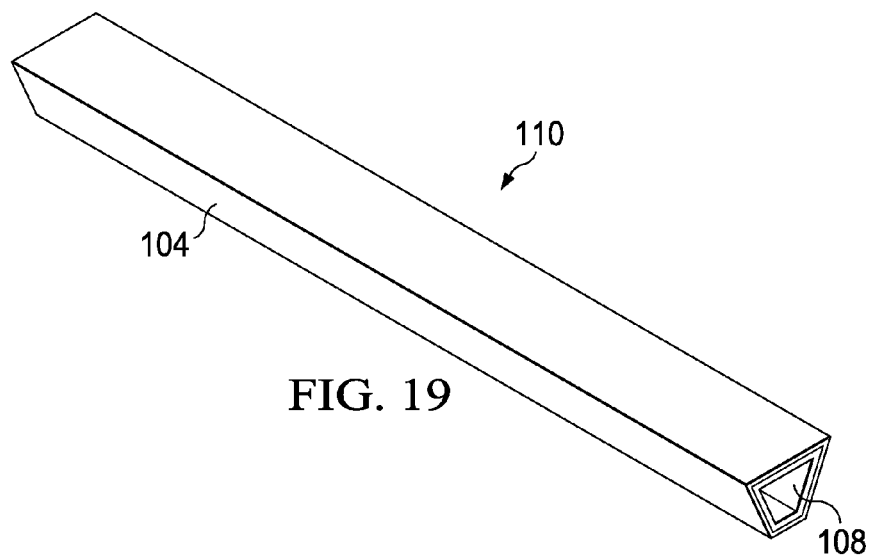
FIG. 19 is an illustration of a perspective view of one of the preform covered mandrels shown in FIG. 18.
Figure 18:
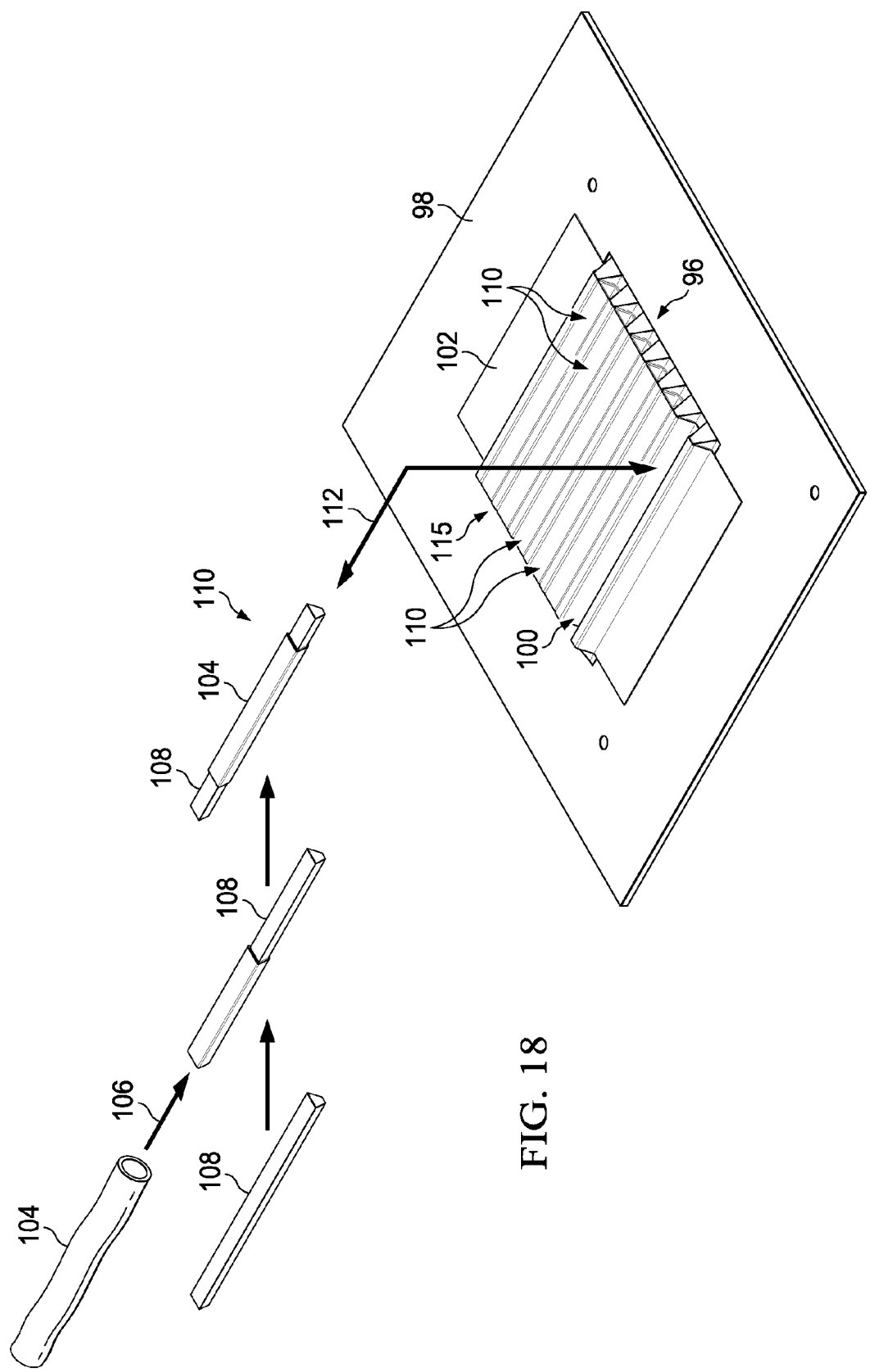
FIG. 18 is an illustration of a perspective view showing mandrels being covered with fiber preforms and placed in the tool.

FIGS. 15-24 illustrate an infusion tool and a method of fabricating the truss frame 50 described above, using resin infusion of fiber reinforcement preforms, hereinafter referred to as fiber reinforcements. As shown in FIG. 15, a corrugated tool 96 supported on a tool base 98 includes a plurality of substantially parallel slot-like grooves 100 generally corresponding in cross sectional shape to that of the truss elements 54. In FIG. 17, a layup 115 is assembled by first placing a dry or substantially dry fiber reinforcement ply stack 102 on the corrugated tool 96 and pressing the ply stack 102 into the grooves 100. Next, as shown in FIGS. 18 and 19, a plurality of mandrels 108 are each wrapped with a fiber reinforcement preform 104, which may comprise for example and without limitation, a braided fiber sleeve. The mandrels 108 have a cross sectional shape substantially corresponding to that of the grooves 100 (FIG. 6). The wrapped mandrels shown at 110 are placed in the grooves 100, overlying the partially formed ply stack 102.

Figure 20:
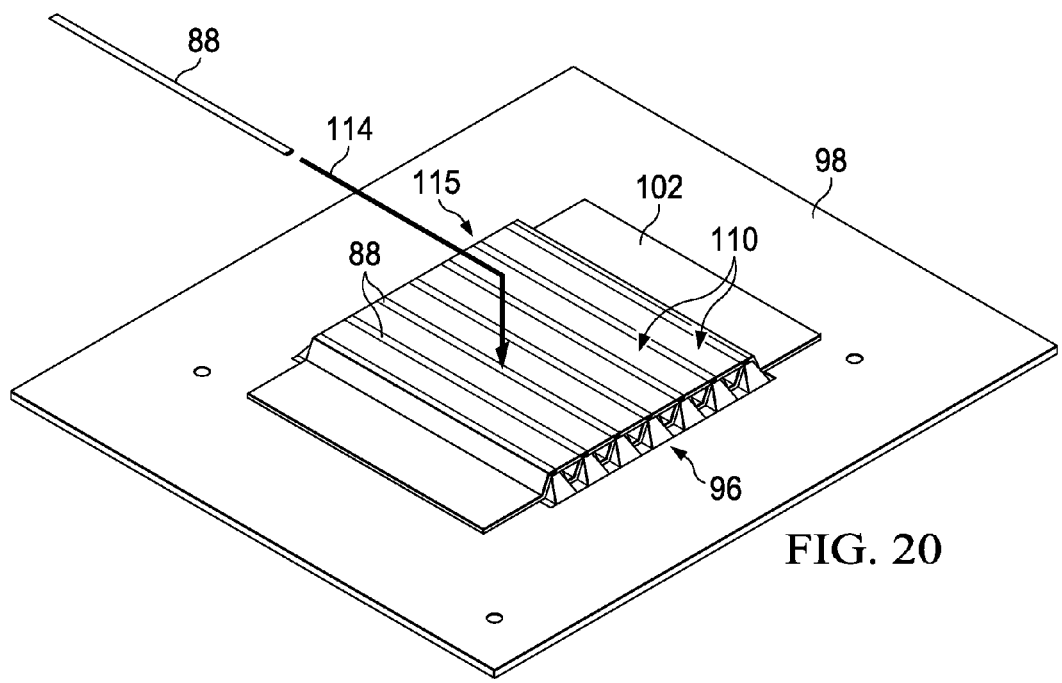
FIG. 20 is an illustration similar to FIG. 18 but showing filler noodles being placed in the layup.
Figure 21:
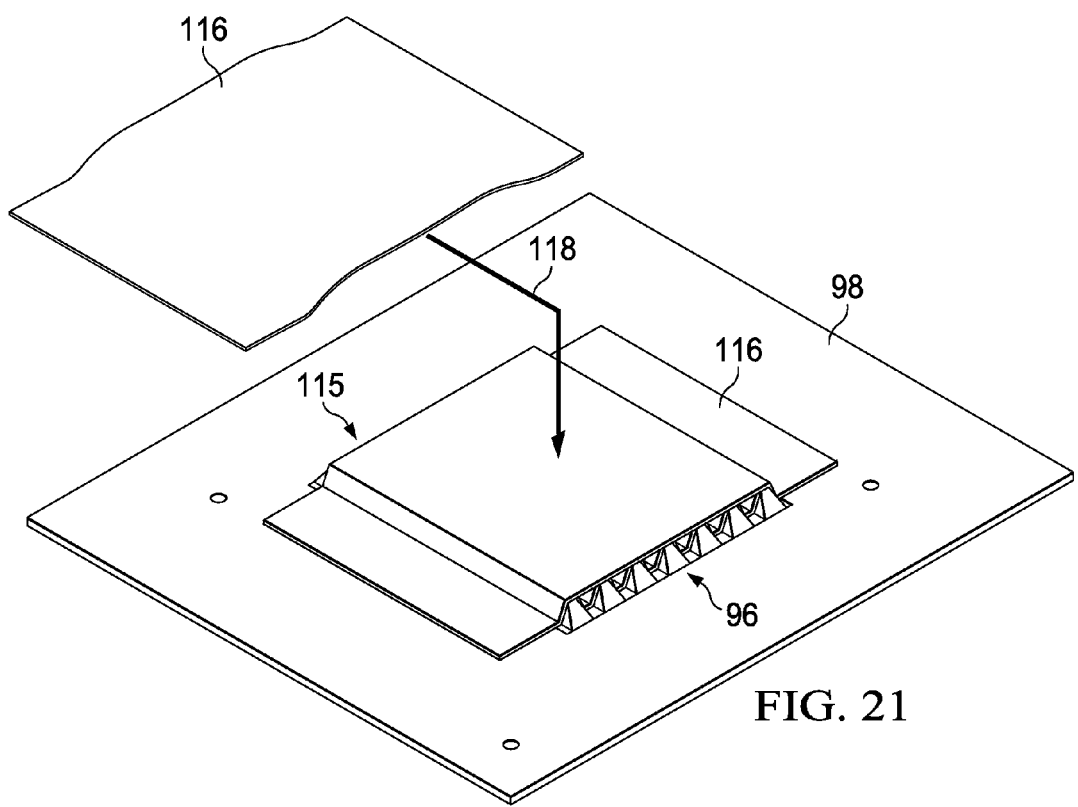
FIG. 21 is an illustration of a perspective view of the tool in which another ply is being placed over the layup.
Figure 22:
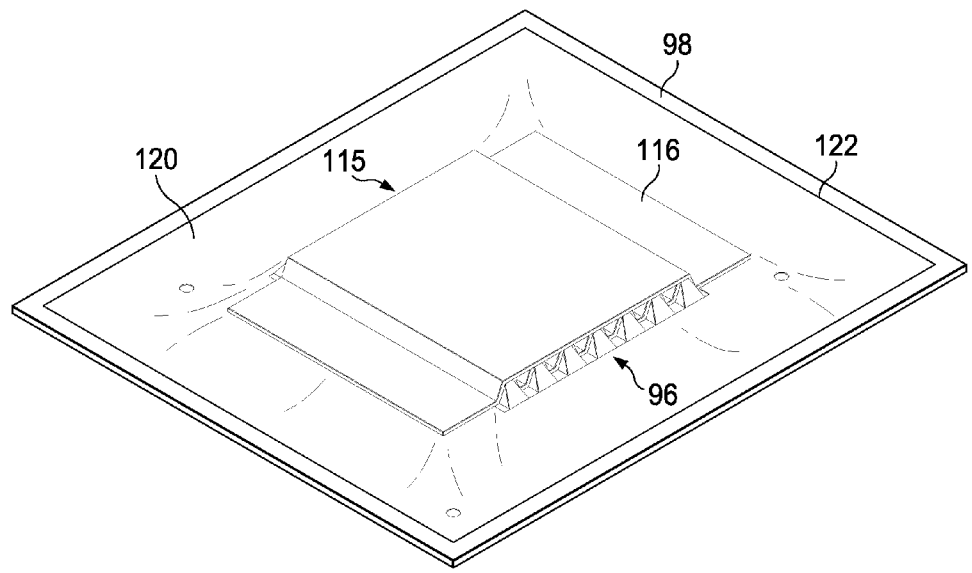
FIG. 22 is an illustration of the tool at a later stage in which a vacuum bag has been installed on the tool.

Next, as shown in FIG. 20, the fillers 88 are individually installed in the layup 115, between adjacent ones of the wrapped mandrels 110. Then, as shown in FIG. 21, a substantially flat dry fiber reinforcement ply stack 116 is placed over the layup 115. Referring to FIG. 22, the next step in the fabrication process comprises installing consumables such as peel plies, breathers, resin infusion tubes, etc. (all not shown) over the layup 115. A vacuum bag 120 is then installed over the layup 115 and sealed to the tool base 98 using a peripheral seal 122. Although not shown in the drawings, a suitable vacuum source and source of resin infusion are each coupled with the bag 120.

Figure 23:
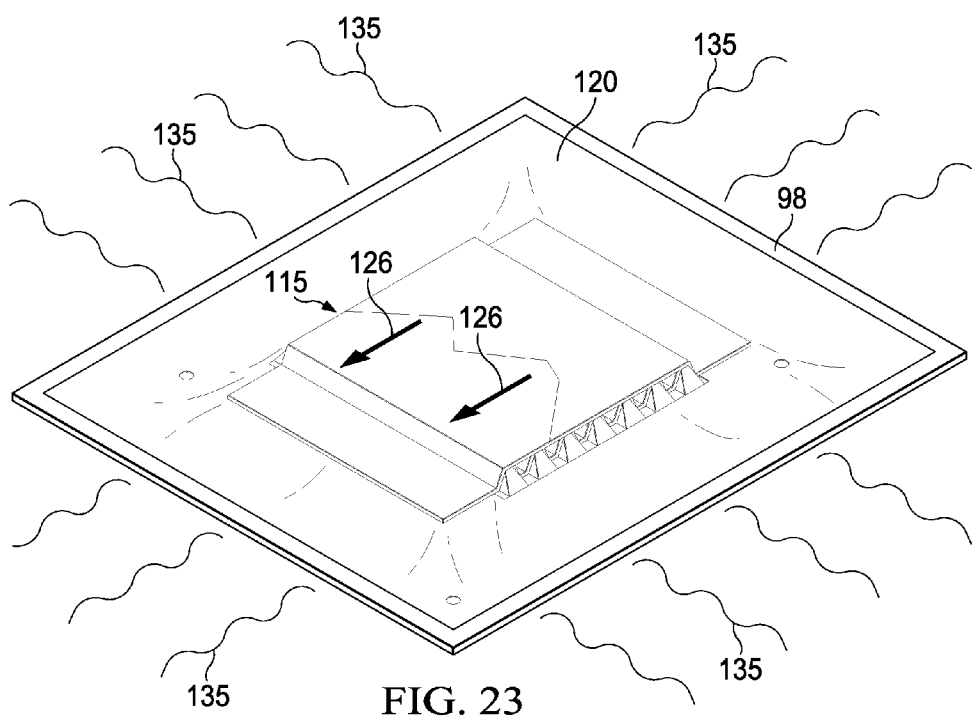
FIG. 23 is an illustration similar to FIG. 22 but showing heat being applied to the layup and an initial flow of resin through the fiber preforms.

Referring to FIG. 23, the next step in the process comprises applying a vacuum to the bag 120 in order to compact the layup 115 while the layup 115 is subjected to heat 135. Resin is infused into the layup 115 which flows 126 through the fiber preforms 102, 104, 116 thereby impregnating the layup 115 with resin which is cured by the heat 135. The heat may be supplied by an oven, or other heat sources.

Figure 24:
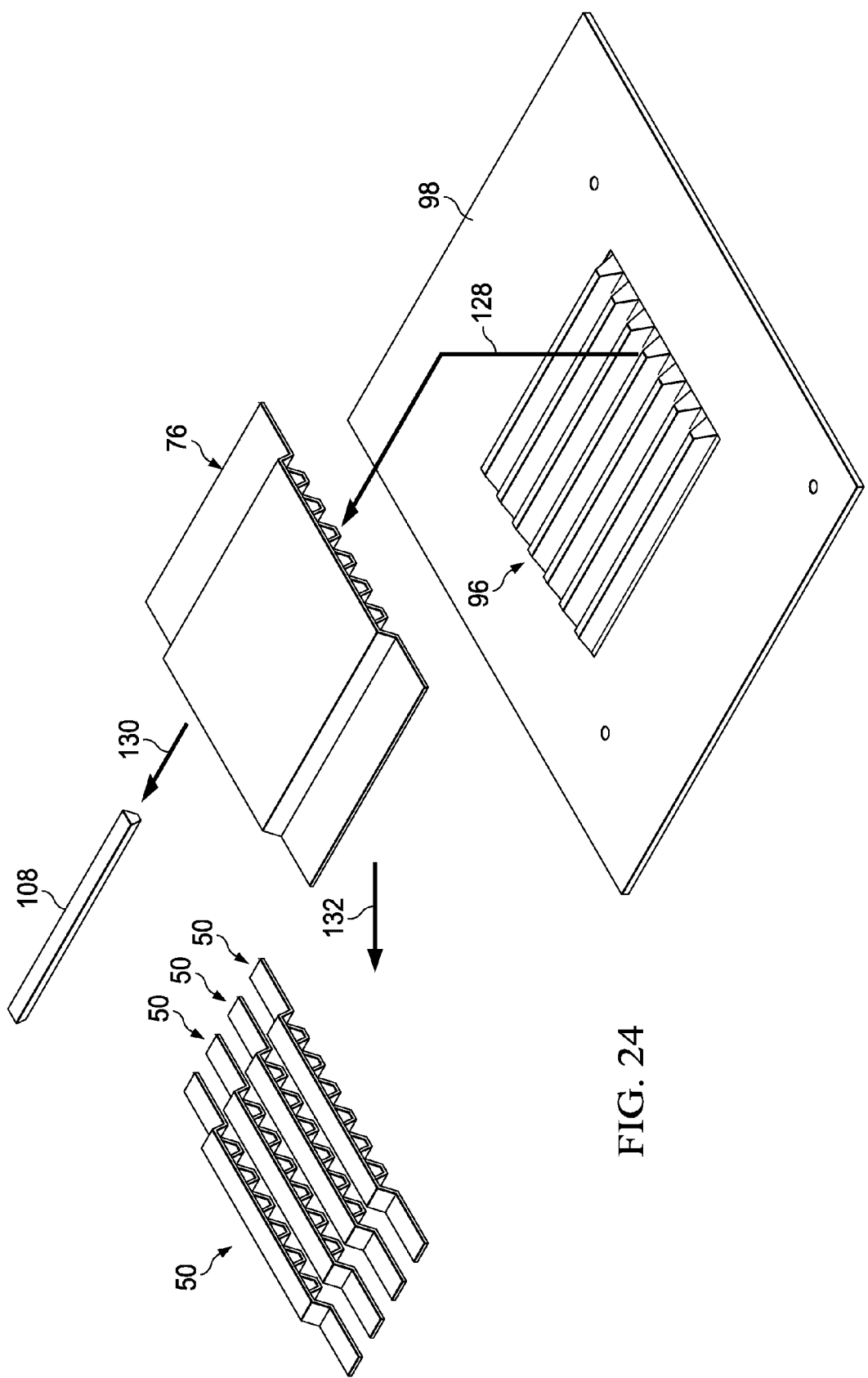
FIG. 24 is an illustration of a perspective view of the tool showing the cured part being removed and cut into individual frames.

FIG. 24 illustrates a further step in the process in which the cured panel 76 (see also FIG. 7) is removed or de-molded 128 from the corrugated tool 96, and each of the mandrels 108 is removed 130 from the panel 76. Then, as shown at 132, the panel 76 is cut into individual truss frames 50 of the desired width.

Figure 25:
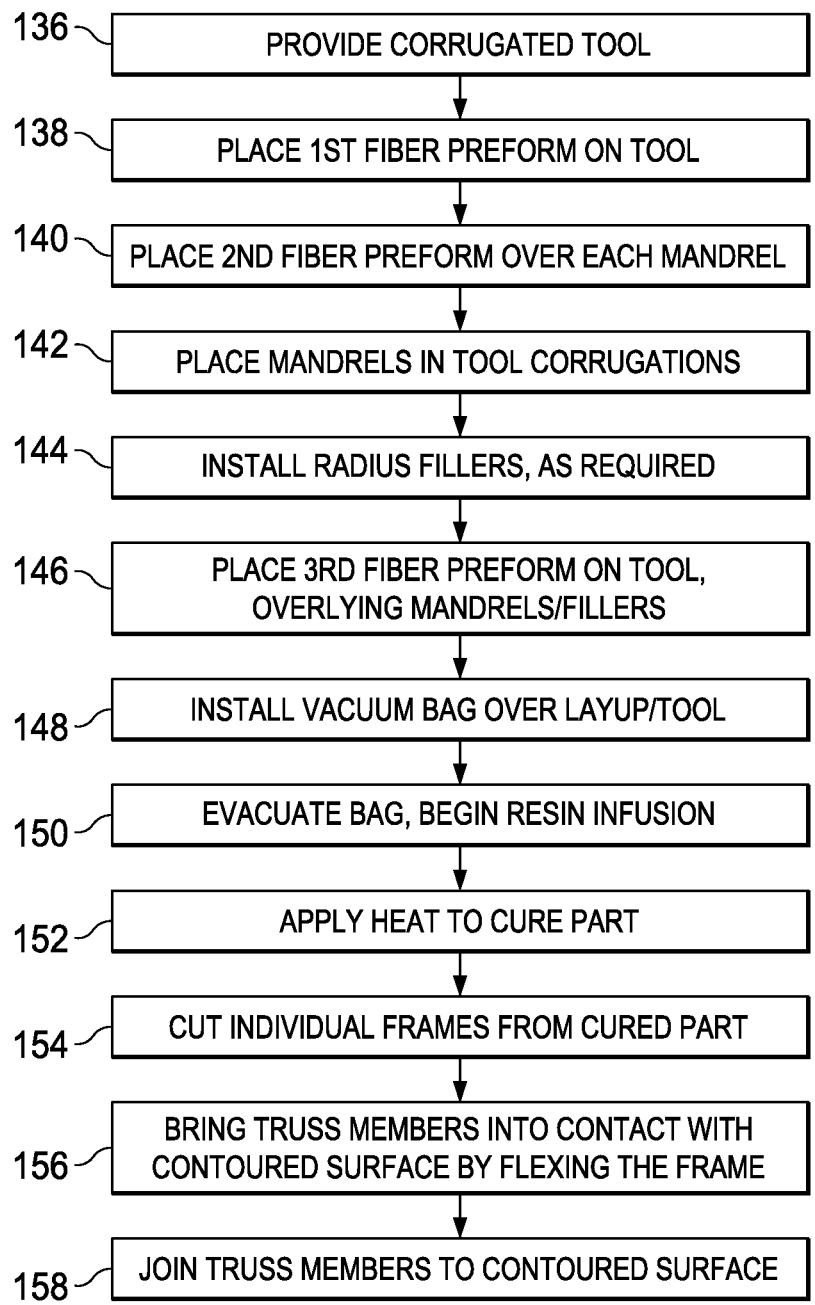
FIG. 25 is an illustration of a flow diagram of a method of installing frames on a contoured surface.

FIG. 25 illustrates a method of fabricating a truss frame 50 and installing the frame 50 on a contoured surface 72, such as an airframe skin 70. At 138, a first fiber reinforcement 102 is placed on a corrugated tool 96, and at 140 a second fiber reinforcement 104 is wrapped around each of a plurality of forming mandrels 108. The wrapped mandrels 110 are placed in grooves 100 in the corrugated tool 96 at step 142. Fillet noodles 88 may be installed, as required, at step 144. At step 146, a third fiber reinforcement 116 is placed on the corrugated tool 96, overlying the wrapped mandrels 110 and the fillet noodles 88. At 148, a vacuum bag 120 is installed over the layup 115 and sealed to the tool 98. At 150, the bag 120 is evacuated and resin infusion of the layup 115 is commenced. At 152, the layup 115 is subjected to an appropriate thermal cure cycle which cures the layup 115 into a finished panel 76.

Following curing, the panel 76 is removed from the tool 96 and cut into individual truss frames 50 at step 154. At 156, during installation of the frames 50 on the skin 70, the truss flaying surfaces 58 of the truss elements 54 are brought into contact with the contoured surface 72 of the skin 70 by flexing the frame 50 along its length so as to conform the faying surfaces to the contoured surface 72. At 158, the truss elements 50 are joined to the contour skin surface 72 by bonding, fasteners or other suitable techniques.

Figure 26:
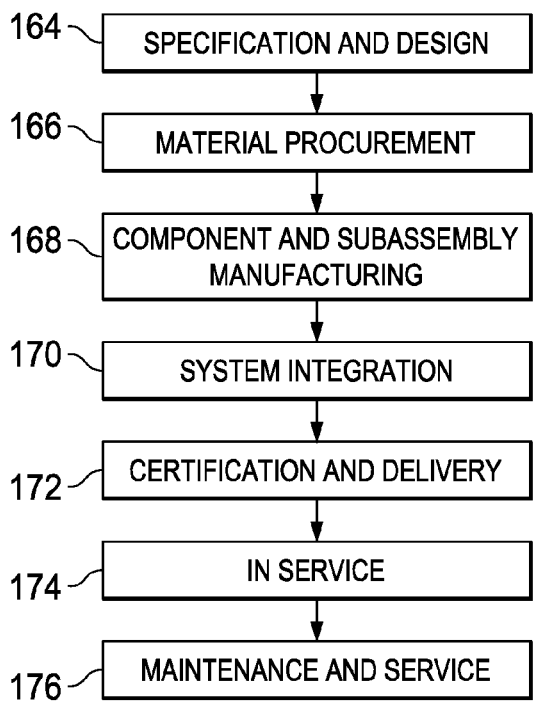
FIG. 26 is an illustration of a flow diagram of aircraft production and service methodology.
Figure 27:
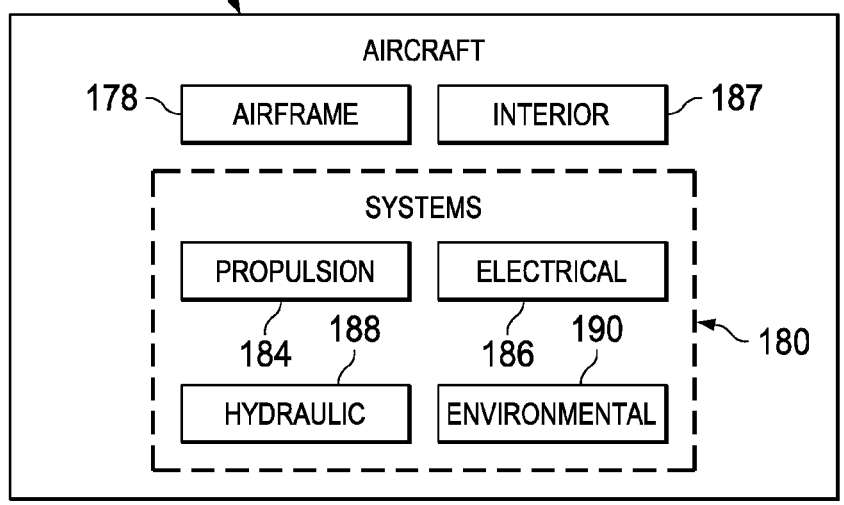
FIG. 27 is an illustration of a block diagram of an aircraft.

Referring now to FIGS. 26 and 27, embodiments of the disclosure may be employed in the context of an aircraft manufacturing and service method 160 as shown in FIG. 26 and aircraft 162 as shown in FIG. 27. Turning first to FIG. 26, an illustration of an aircraft manufacturing and service method 160 is depicted in accordance with an advantageous embodiment. During pre-production, aircraft manufacturing and service method 160 may include specification and design 164 of aircraft 162 in FIG. 27 and material procurement 164.

During production, component and subassembly manufacturing 168 and system integration 170 of aircraft 162 in FIG. 27 takes place. Thereafter, aircraft 162 in FIG. 27 may go through certification and delivery 172 in order to be placed in service 174. While in service 174 by a customer, the aircraft 162 in FIG. 27 is scheduled for routine maintenance and service 176, which may include modification, reconfiguration, refurbishment, and other maintenance or service.

Each of the processes of aircraft manufacturing and service method 160 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 27, an illustration of an aircraft 162 is depicted in which an advantageous embodiment may be implemented. In this example, aircraft 162 is produced by aircraft manufacturing and service method 160 in FIG. 26 and may include airframe 178 with plurality of systems 180 and interior 182. Examples of systems 180 include one or more of propulsion system 184, electrical system 186, hydraulic system 188, and environmental system 190. Any number of other systems may be included. Although an aerospace example is shown, different advantageous embodiments may be applied to other industries, such as the marine and automotive industries.

Apparatuses and methods embodied herein may be employed during at least one of the stages of aircraft manufacturing and service method 160 in FIG. 26. In one illustrative example, components or subassemblies produced in component and subassembly manufacturing 168 in FIG. 26 may be fabricated or manufactured in a manner similar to components or subassemblies produced while aircraft 162 is in service 174 FIG. 26. As yet another example, a number of apparatus embodiments, method embodiments, or a combination thereof may be utilized during production stages, such as component and subassembly manufacturing 106 and system integration 170 in FIG, 26. A number, when referring to items, means one or more items. For example, a number of apparatus embodiments is one or more apparatus embodiments. A number of apparatus embodiments, method embodiments, or a combination thereof may be utilized while aircraft 162 is in service 174 and/or during maintenance and service 176 in FIG. 26. The use of a number of the different advantageous embodiments may substantially expedite the assembly of and/or reduce the cost of aircraft 162.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of fabricating an airframe, comprising:
   providing a skin having a contoured surface;
   making a frame having a plurality of truss elements, forming a truss;
   bringing the truss elements into contact with the contoured surface of the skin by flexing the frame; and
   joining the frame to the skin.

2. The method of claim 1, wherein making the frame includes:
   laying up fiber reinforcements on a tool,
   infusing the fiber reinforcements with resin, creating resin infused fiber reinforcements; and
   curing the resin infused fiber reinforcements.

3. The method of claim 2, wherein laying up fiber reinforcements on the tool includes:
   placing fiber reinforcements around each of a plurality of mandrels, and
   placing the mandrels on the tool.

4. The method of claim 2, wherein making the frame includes:
   forming a panel by joining a substantially flat panel member with a corrugated panel member, and
   cutting sections of the panel.

5. The method of claim 4, wherein the substantially flat panel of the frame is disposed opposite the skin relative to the truss such that the truss is disposed between the substantially flat panel and the skin.

6. The method of claim 1, wherein making the frame having the plurality of truss elements includes joining adjacent ones of the plurality of truss elements to each other at corresponding nodes, and wherein the frame is flexed at the corresponding nodes.

7. The method of claim 1, wherein making the frame having the plurality of truss elements includes joining a cap to the plurality of truss elements, the cap extending across the plurality of truss elements.

8. The method of claim 7, wherein making the frame further includes forming integrated nodes at intersections between the cap and the plurality of truss elements.

9. The method of claim 1, wherein making the frame having the plurality of truss elements includes:
   joining adjacent ones of the plurality of truss elements to each other at corresponding nodes, and wherein the frame is flexible at the corresponding nodes;
   joining a cap to the plurality of truss elements, the cap extending across the plurality of truss elements; and
   forming integrated nodes at intersections between the cap and the plurality of truss elements.

10. The method of claim 1, wherein making the frame having the plurality of truss elements includes forming adjacent ones of the plurality of truss elements spaced apart from each other to define gaps configured to receive stiffeners.

11. The method of claim 1, wherein the frame comprises a flexible frame.

* * * * *